(12) United States Patent
Kao et al.

(10) Patent No.: US 12,375,487 B2
(45) Date of Patent: Jul. 29, 2025

(54) DEVICE, METHOD AND SYSTEM OF HANDLING ACCESS CONTROL

(71) Applicant: Moxa Inc., New Taipei (TW)

(72) Inventors: Chi-Yuan Kao, New Taipei (TW); Ching-Ting Liu, New Taipei (TW); Yue-Ting Cai, New Taipei (TW)

(73) Assignee: Moxa Inc., New Taipei (TW)

( * ) Notice: Subject to any disclaimer, the term of this patent is extended or adjusted under 35 U.S.C. 154(b) by 398 days.

(21) Appl. No.: 17/680,254

(22) Filed: Feb. 24, 2022

(65) Prior Publication Data

US 2023/0208838 A1    Jun. 29, 2023

(30) Foreign Application Priority Data

Dec. 28, 2021  (TW) ................................ 110149027

(51) Int. Cl.
*H04L 9/40* (2022.01)
*H04L 12/46* (2006.01)

(52) U.S. Cl.
CPC ...... *H04L 63/0884* (2013.01); *H04L 12/4641* (2013.01); *H04L 63/0823* (2013.01);
(Continued)

(58) Field of Classification Search
CPC ............. H04L 63/0884; H04L 12/4641; H04L 63/0823; H04L 63/083; H04L 63/0876;
(Continued)

(56) References Cited

U.S. PATENT DOCUMENTS

| 10,097,523 B2 | 10/2018 | Kuker | |
|---|---|---|---|
| 2002/0169881 A1* | 11/2002 | Fritsche | H04L 9/40 709/225 |

(Continued)

FOREIGN PATENT DOCUMENTS

| CN | 101610155 A | 12/2009 |
|---|---|---|
| CN | 102291386 | 12/2011 |

(Continued)

OTHER PUBLICATIONS

Anonymous, Port forwarding, Wikipedia, Dec. 13, 2021, pp. 1-5, XP093043695.

*Primary Examiner* — Abu S Sholeman
(74) *Attorney, Agent, or Firm* — Winston Hsu

(57) ABSTRACT

A management device comprises a first authentication module, for receiving a first information and performing a first determination on whether an administrator device is correct according to the first information; an authorization module, coupled to the first authentication module, for performing a second determination on whether the administrator device comprises an access qualification for a remote device, when the first determination is positive and when receiving a first request message for accessing the remote device; a communication module, coupled to the authorization module, for transmitting a second request message for establishing a connection with a network device to the remote device, when the second determination is positive and when determining to establish the connection with the network device; an integration module, coupled to the authorization module, for transmitting a third request message for configuring a port forwarding to the network device, when the second determination is positive.

24 Claims, 5 Drawing Sheets

(52) U.S. Cl.
CPC ........ *H04L 63/083* (2013.01); *H04L 63/0876* (2013.01); *H04L 63/107* (2013.01); *H04L 63/108* (2013.01)

(58) Field of Classification Search
CPC . H04L 63/107; H04L 63/108; H04L 61/2514; H04L 61/2582; H04L 63/10; H04L 63/02; H04L 63/0272; H04L 63/0861; H04L 63/20; G06F 21/31; G06F 2221/2141
See application file for complete search history.

(56) References Cited

U.S. PATENT DOCUMENTS

| | | |
|---|---|---|
| 2006/0143702 A1 | 6/2006 | Hisada |
| 2007/0118877 A1* | 5/2007 | Karabulut ............. H04L 63/105 726/3 |
| 2008/0040810 A1* | 2/2008 | Kurokawa ........... H04N 1/2166 726/26 |
| 2011/0277019 A1 | 11/2011 | Pritchard, Jr. |
| 2013/0133043 A1 | 5/2013 | Barkie |
| 2014/0164775 A1* | 6/2014 | Wu ......................... H04L 63/10 713/171 |
| 2014/0282376 A1* | 9/2014 | Hille-Doering ........... G06F 8/31 717/109 |
| 2015/0150114 A1 | 5/2015 | Kuker |
| 2020/0007531 A1* | 1/2020 | Koottayi ............... H04L 67/146 |
| 2022/0092082 A1* | 3/2022 | Lee ....................... G06F 16/235 |

FOREIGN PATENT DOCUMENTS

| | | |
|---|---|---|
| CN | 113595847 | 11/2021 |
| TW | I445388 B | 7/2014 |
| TW | 201509151 A | 3/2015 |
| TW | M534941 U | 1/2017 |
| TW | 202127290 A | 7/2021 |
| TW | 202133010 A | 9/2021 |
| WO | 2016/057177 A1 | 4/2016 |
| WO | 2021/208861 A1 | 10/2021 |

* cited by examiner

DEVICE, METHOD AND SYSTEM OF HANDLING ACCESS CONTROL

CROSS REFERENCE TO RELATED APPLICATION

This application claims priority of Taiwan Application No. 110149027 filed on Dec. 28, 2021, which is incorporated herein by reference.

BACKGROUND OF THE INVENTION

1. Field of the Invention

The present invention relates to a device, a method and a system, and more particularly, to a device, a method and a system of handling an access control.

2. Description of the Prior Art

In a network, an administrator device and a remote device connect to a virtual private network (VPN) and the administrator device accesses the remote device according to access information (e.g., password) of the remote device, when the administrator device accesses the remote device. However, the number of access information of remote devices increases with the increasing number of the remote devices, such that a cost of managing the access information increases significantly. Multiple remote devices may be configured with the same or related access information to save the cost. In this situation, the access information of the remote devices is easily obtained when the access information of the VPN is stolen, such that the remote devices are exposed to a risk of an unauthorized access, and a security of the network is greatly reduced. Thus, how to access the remote device to improve the security of the network is an important problem to be solved.

SUMMARY OF THE INVENTION

The present invention therefore provides a device, a method and a system of handling an access control, to solve the abovementioned problem.

A management device for handling an access control comprises a first authentication module, for receiving a first information and performing a first determination on whether an administrator device is correct according to the first information; an authorization module, coupled to the first authentication module, for performing a second determination on whether the administrator device comprises an access qualification for a remote device, when the first determination is positive and when receiving a first request message for accessing the remote device; a communication module, coupled to the authorization module, for transmitting a second request message for establishing a connection with a network device to the remote device, when the second determination is positive and when determining to establish the connection with the network device; and an integration module, coupled to the authorization module, for transmitting a third request message for configuring a port forwarding to the network device, when the second determination is positive.

A method of handling an access control for a management device comprises receiving a first information and performing a first determination on whether an administrator device is correct according to the first information; performing a second determination on whether the administrator device comprises an access qualification for a remote device, when the first determination is positive and when receiving a first request message for accessing the remote device; transmitting a second request message for establishing a connection with a network device to the remote device, when the second determination is positive and when determining to establish the connection with the network device; and transmitting a third request message for configuring a port forwarding to the network device, when the second determination is positive.

A system of handling an access control comprises a management device and a network device, wherein the management device comprises: a first authentication module, for receiving a first information and performing a first determination on whether an administrator device is correct according to the first information; an authorization module, coupled to the first authentication module, for performing a second determination on whether the administrator device comprises an access qualification for a remote device, when the first determination is positive and when receiving a first request message for accessing the remote device; a communication module, coupled to the authorization module, for transmitting a second request message for establishing a connection with the network device to the remote device, when the second determination is positive and when determining to establish the connection with the network device; and an integration module, coupled to the authorization module, for transmitting a third request message for configuring a port forwarding to the network device, when the second determination is positive; and the network device comprises: a connection module, for receiving a fourth request message for establishing a second connection from the remote device, and establishing the second connection with the remote device according to the fourth request message; an integration module, coupled to the connection module, for receiving the third request message for configuring the port forwarding to the remote device from the management device, and establishing the port forwarding according to the third request message, and transmitting a first path to the management device in response to the third request message; and a network service module, coupled to the integration module, for receiving a fifth request message for accessing the remote device from the administrator device, and performing an application level service with the remote device according to the fifth request message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
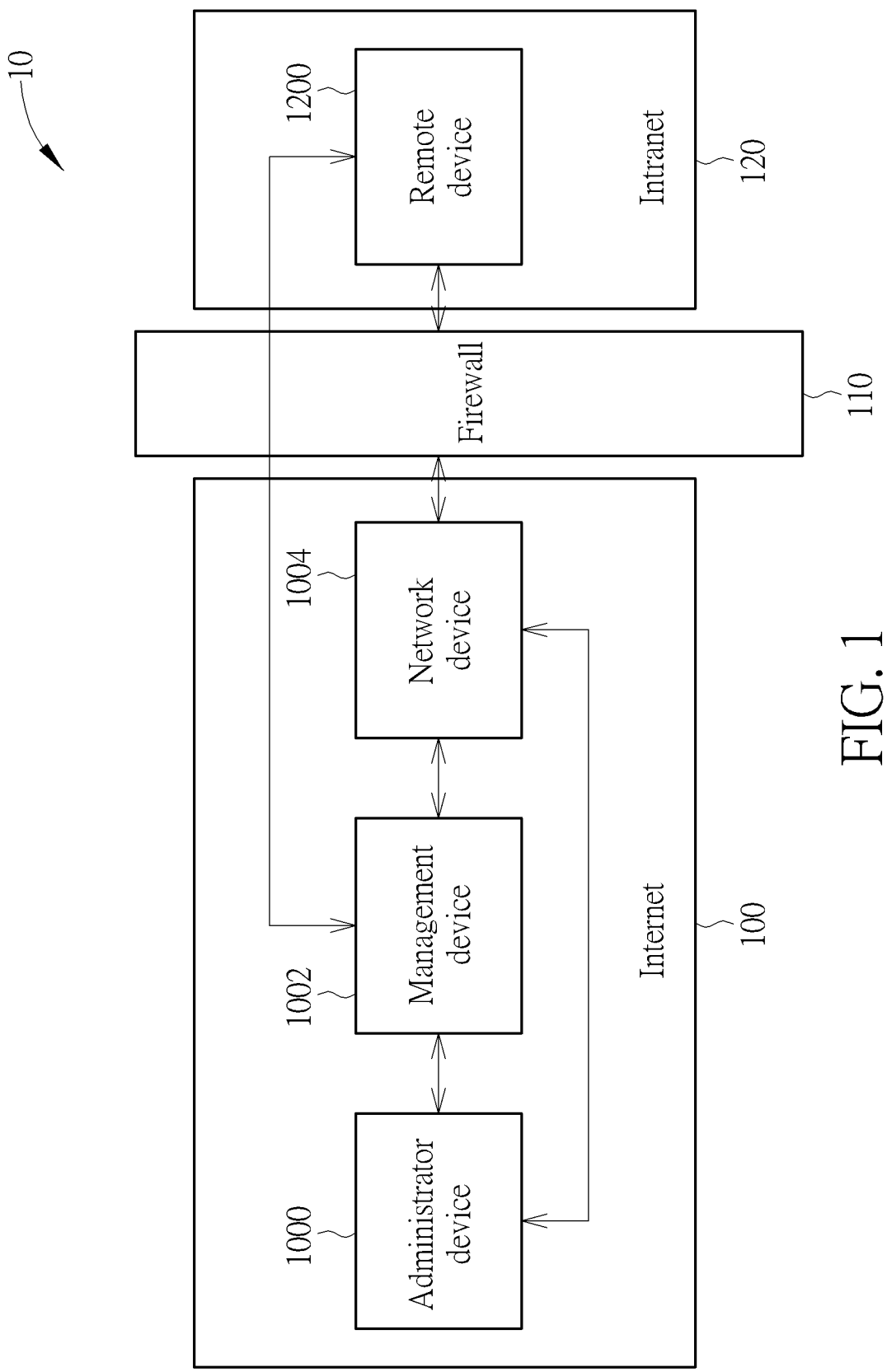
FIG. 1 is a schematic diagram of a network according to an example of the present invention.

FIG. 1 is a schematic diagram of a network 10 according to an example of the present invention. The network 10 may include an internet 100, a firewall 110 and an intranet 120. As shown in FIG. 1, the network 10 may be separated into the internet 100 and the intranet 120 via the firewall 110. In detail, the internet 100 may be a public network, which may include an administrator device 1000, a management device 1002 and a network device 1004. The administrator device 1000 may be a communication device used by an administrator. The management device 1002 may be a communication device, which is used for handling an access control. The network device 1004 may be a virtual private network (VPN) server, which is used for establishing a VPN, such as extending the intranet 120 such that devices in the internet 100 and the intranet 120 may perform data transmission and reception via the internet 100. The firewall 110 may be a security device in the network 10, which may be used for separating different networks (e.g., the internet 100 and the intranet 120) and may be used for managing (e.g., controlling) data transmission and reception in the intranet 120 to insure the security of the intranet 120. The intranet 120 may be a private network, which may include a remote device 1200. The remote device 1200 may be a communication device.

The above communication devices may include user equipments (UEs), low-cost devices (e.g., machine type communication (MTC)), device-to-device (D2D) communication devices, narrow-band IoT (NB-IoT) devices, electric devices, servers, mobile phones, various types of computers (e.g., desktops, laptops, tablets), an electronic book, portable computer systems, or combination thereof, but is not limited herein.

Figure 2:
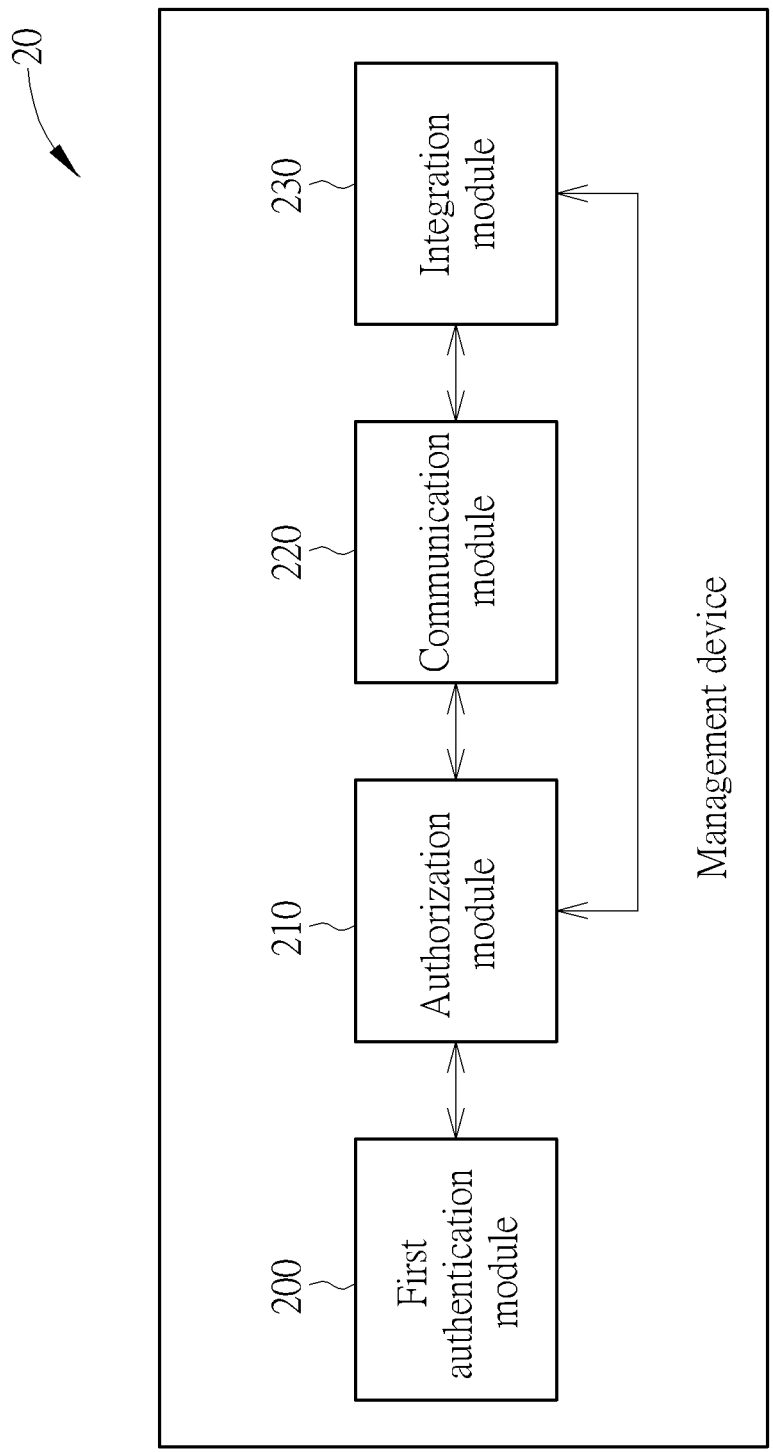
FIG. 2 is a schematic diagram of a management device according to an example of the present invention.

FIG. 2 is a schematic diagram of a management device 20 according to an example of the present invention, and may be used for realizing the management device 1002 in FIG. 1, for handling an access control. The management device 20 may include a first authentication module 200, an authorization module 210, a communication module 220 and an integration module 230. In detail, the first authentication module 200 may receive a first information from an administrator device (e.g., the administrator device 1000 in FIG. 1), and may perform a first determination on whether the administrator device is correct according to the first information. The authorization module 210 may be coupled to the first authentication module 200, and may perform a second determination on whether the administrator device includes an access qualification for a remote device (e.g., the remote device 1200 in FIG. 1), when the first determination is positive (i.e., the administrator device is correct) and when The authorization module 210 receives a first request message for accessing the remote device from the administrator device. The communication module 220 may be coupled to the authorization module 210, and may transmit a second request message for establishing a connection with a network device (e.g., the network device 1004 in FIG. 1) to the remote device, when the second determination is positive (i.e., the administrator device includes the access qualification for the remote device) and when the communication module 220 determines to establish the connection with the network device. The integration module 230 may be coupled to the authorization module 210 or the communication module 220. The integration module 230 may transmit a third request message for configuring a port forwarding to the network device, when the second determination is positive.

In one example, the first information may include (e.g., be) an account name and a password for the administrator device to access the management device 20. In one example, the administrator device may access the management device 20 via opening a browser, connecting to the management device 20 on the browser and entering (e.g., inputting) the account name and the password of the management device 20. In one example, the first authentication module 200 may create an account of the administrator device, and may store information of the administrator device in the account of the administrator device, e.g., an account name, a password, a certificate, an email address or a mobile phone number, but is not limited herein. In one example, the first authentication module 200 may create a plurality of accounts of a plurality of administrator devices in the network 10, and may store information of the plurality of administrator devices in the plurality of accounts. In one example, the first authentication module 200 may compare the first information with the stored information of the plurality of administrator devices. The first authentication module 200 may perform the first determination that the administrator device is correct, when the former and the latter include the same account name and the same password.

In one example, the first authentication module 200 may include a second authentication module. The second authentication module may determine whether to perform a multi factor authentication (MFA) on the administrator device according to configuration of the first authentication module 200, when the first determination is positive. That is, in addition to the account name and the password of the administrator device, the first authentication module 200 may determine whether the administrator device is correct by using one or more other factors. In one example, the second authentication module may perform the MFA on the administrator device via transmitting a short message service (SMS) message to the administrator device. In detail, the second authentication module may transmit the SMS message (e.g., including a verification code) to the administrator device. The administrator device may transmit corresponding information (e.g., the verification code) to the second authentication module according to the SMS message, in response to the SMS message. The second authentication module may compare the SMS message with the information transmitted by the administrator device. The second authentication module may determine that the administrator device is correct when the SMS message and the information correspond to each other (e.g., the verification codes are the same). In one example, the second authentication module may perform the MFA on the administrator device via the SMS message, biometrics (e.g., scanning biometric features such as fingerprint(s) or iris(es)), a verification code application (e.g., entering a verification code of the verification code application), other suitable ways for authenticating the administrator device or combination thereof.

In one example, the authorization module 210 may receive the first request message from the administrator device. In one example, the access qualification may include at least one of an access right for accessing the remote device, accessing the remote device in an allowed time period (e.g., 09:00~18:00), or accessing the remote device in an allowed area (e.g., country or city). In one example, the authorization module 210 may create an access qualification of the administrator device, and may store the access qualification of the administrator device in the account of the administrator device. In one example, the authorization module 210 may create a plurality of access qualifications of the plurality of administrator devices, and may store the plurality of access qualifications of the plurality of administrator devices in the plurality of accounts. In one example, the authorization module 210 may obtain (e.g., search for)

the access qualification of the administrator device from the stored plurality of access qualifications of the plurality of administrator devices according to the information of the administrator device. The authorization module 210 may compare the remote device to be accessed by the administrator device, the time period of accessing the remote device and the area of accessing the remote device with the access qualification of the administrator device. The authorization module 210 may perform the second determination that the administrator device include the access qualification for the remote device, when the former and the latter correspond (e.g., are consistent) to each other (e.g., the administrator device has the access right for accessing the remote device, the time period of accessing the remote device is in the allowed time period, and the area of accessing the remote device is in the allowed area).

In one example, the authorization module 210 may perform a third determination on whether the administrator device includes the access right of the remote device when the first determination is positive, and the authorization module 210 may transmit a second information of the remote device to the administrator device when the third determination is positive. The second information may include an identity of the remote device (e.g., a name of the remote device). In one example, the identity of the remote device may be displayed on the browser of the administrator device.

In one example, the communication module 220 may determine to establish the connection with the network device, when the connection is not established with the network device (e.g., the connection with the network device does not exist). In one example, the communication module 220 may determine not to establish the connection with the network device, when the connection is established with the network device (e.g., the connection with the network device exists). That is, the communication module 220 may perform data transmission and reception with the network device via a previously established connection when the previously established connection with the network device exists. The communication module 220 may not need to reestablish the connection with the network device. In one example, the second request message may include an internet protocol (IP) address of the network device. In one example, the second request message may include data needed to establish the connection with the network device.

In one example, the communication module 220 may transmit the second request message to the remote device and the communication module 220 may receive a response message transmitted by the remote device via a communication protocol used for message transmission (e.g., message queuing telemetry transport (MQTT), advanced message queuing protocol (AMQP) or constrained application protocol (CoAP), but is not limited herein). In the above example, the communication module 220 may include (e.g., install) a MQTT broker application, and may create an identity of the remote device (e.g., a client ID) and information needed to establish a connection with the remote device, e.g., a client secret or a certificate, but is not limited herein. In addition, the remote device may include (e.g., install) a MQTT client application, and may enter the identity of the remote device (e.g., receive from the communication module 220) and information needed to establish the connection with the remote device. A firewall (e.g., the firewall 110 in FIG. 1) between the communication module 220 and the remote device may open a port (e.g., port 8883) for a MQTT transmission. The remote device may connect to the MQTT broker application of the communication module 220 when initiating the MQTT client application, to establish a connection. When the connection is established, the communication module 220 and the network device may perform data transmission and reception.

In one example, the third request message may include a source IP address of the administrator device, and is determined (e.g., configured) as an external IP address of the administrator device. That is, the administrator device or the management device 20 may access the network device via the source IP address of the administrator device. In one example, the third request message may include a destination IP address of the administrator device, and is determined as an IP address of the remote device. In one example, the third request message may include a destination port of the administrator device, and is determined as a port of the remote device (e.g., a secure shell (SSH) port 22).

In one example, the integration module 230 may transmit a fourth request message for disconnecting the connection between the remote device and the network device to the network device. In one example, the integration module 230 may transmit a fifth request message for removing configuration of the port forwarding of the network device to the network device. In one example, the integration module 230 may transmit a sixth request message to the network device, for the network device to return (e.g., feedback) a list of devices accessing the network device and their connection data. In one example, the integration module 230 may transmit a response message to the network device in response to the network device requesting to verify the administrator device.

In one example, the integration module 230 may receive a first path from the network device in response to the third request message. The integration module 230 may generate a second path according to the first path and an access token, and may transmit the second path to the administrator device. In one example, the management device 20 may generate the access token according to a certificate of the network device. For example, the management device 20 may encrypt data to generate the access token by using the certificate of the network device. In one example, the certificate may include a public key certificate, e.g., X.509, but is not limited herein. In one example, the first path and the second path may include a uniform resource locator (URL), but is not limited herein.

In one example, the administrator device may connect to a website application (Web App) service of the network device via opening (e.g., entering) the second path on the browser. In one example, the network device may determine whether the administrator device is correct. For example, the network device may transmit a seventh request message to the management device 20 for verifying whether the administrator device is correct (e.g., requesting the management device 20 to check whether the IP address of the administrator device is in the allowed list) via the Web App service. In addition, the network device may generate data according to a private key of the network device and the access token. For example, the network device decrypts the access token to generate the data by using the private key of the network device. The network device may compare the data with the second path. In one example, the data may include a session ID of the management device 20. The network device may check whether the session ID and the second path are the same. In one example, the data may include a valid time period of the access token. The network device may check whether the valid time period of the access token and the time period of the administrator device accessing the remote device are matching (e.g., whether the latter is in the time period of the former), to prevent the administrator device from accessing the remote device by using a path whose valid time period has expired. In one example, the data may include a path for updating the access token. The path is for the network device to transmit an eighth request message for applying for an updated (e.g., within a valid time period) access token to the management device 20, when the valid time period of the access token expires. The network device may determine that the administrator device is correct, when the network device completes verification (e.g., the administrator device is correct) and comparison (e.g., results of the comparison or checking are the same or matching).

In one example, the network device may connect to the remote device via the Web App service and may provide the application level services (e.g., SSH protocol) to the remote device, when the network device determines that the administrator device is correct.

In above examples, the administrator device and the management device 20 may perform data transmission and reception via a transmission protocol used for secure communication (e.g., hyperText transfer protocol secure (HTTPS) or transport layer security (TLS)).

In one example, the management device 20 may include an operation audit module. The operation audit module may be coupled to the integration module 230, and may be used for storing a record of the administrator device accessing the remote device (e.g., in the operation auditing log). In one example, the record of the administrator device accessing the remote device may include all operations in the above examples.

Figure 3:
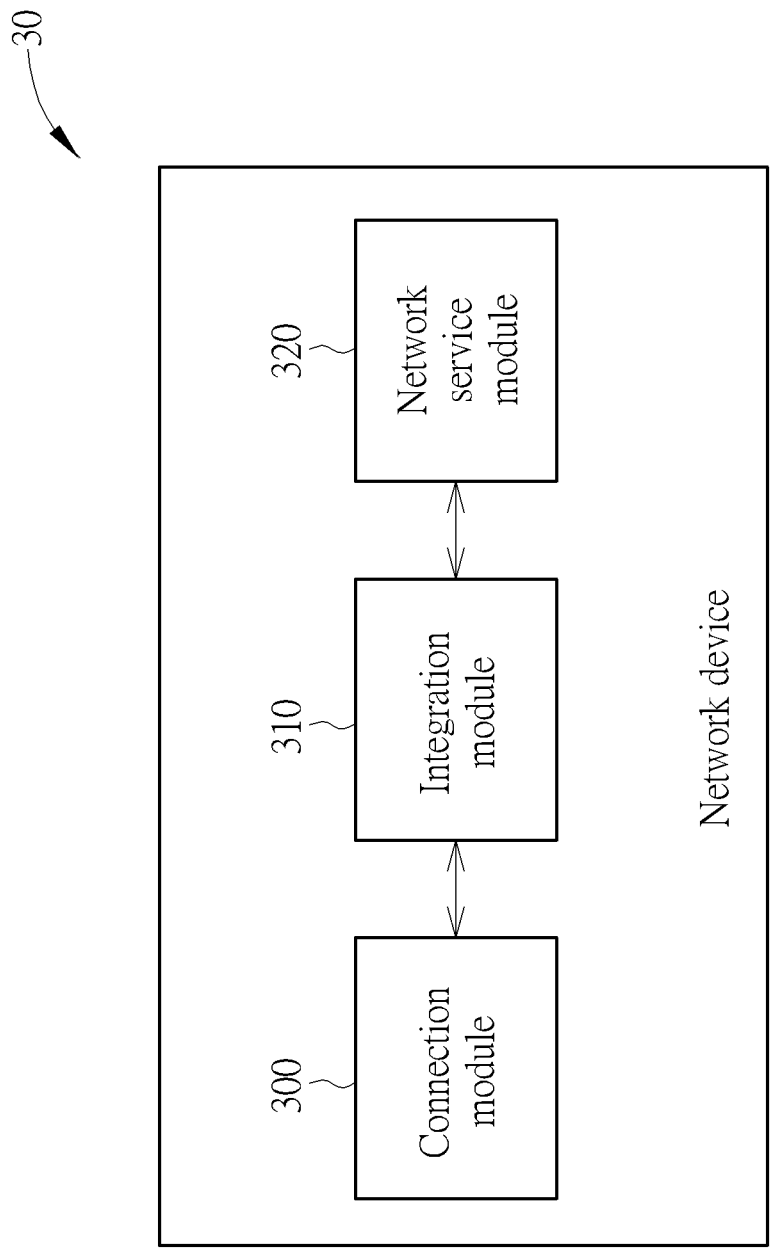
FIG. 3 is a schematic diagram of a network device according to an example of the present invention.

FIG. 3 is a schematic diagram of a network device 30 according to an example of the present invention, and may be used for realizing the network device 1004 in FIG. 1, for handling an access control. The network device 30 may include a connection module 300, an integration module 310 and a network service module 320. In detail, the connection module 300 may receive a ninth request message for establishing a connection from the remote device (e.g., the remote device 1200 in FIG. 1), and may establish the connection with the remote device according to the ninth request message. That is, a tunnel between the connection module 300 and the remote device may be established, and the connection module 300 and the remote device may perform data transmission and reception via the tunnel. The integration module 310 may be coupled to the connection module 300, and may receive a tenth request message for configuring a port forwarding to the remote device from the management device (e.g., the management device 1002 in FIG. 1). The integration module 310 may establish the port forwarding according to the tenth request message and may transmit a first path to the management device, in response to the tenth request message. The network service module 320 may be coupled to the integration module 310, and may receive an eleventh request message for accessing the remote device from the administrator device (e.g., the administrator device 1000 in FIG. 1). The network service module 320 may perform an application level service with the remote device according to the eleventh request message.

In one example, the connection module 300 may wait to receive the ninth request message for establishing the connection, when the ninth request message for establishing the connection is not received from the remote device. In one example, the connection module 300 may receive the fourth request message for disconnecting the connection with the remote device from the management device. The connection module 300 may disconnect the connection with the remote device according to the fourth request message. In one example, the integration module 310 may receive the fifth request message for removing the configuration of the port forwarding of the network device 30 from the management device. The integration module 310 may remove the configuration of the port forwarding of the network device 30 according to the fifth request message. In one example, the integration module 310 may receive the sixth request message for enabling the network device 30 to return the list of the devices accessing the network device 30 and their connection data from the management device. The integration module 310 may return the list of the devices accessing the network device 30 and their connection data to the management device according to the sixth request message. In one example, the integration module 310 may transmit the seventh request message for verifying whether the administrator device is correct to the management device.

Figure 4:
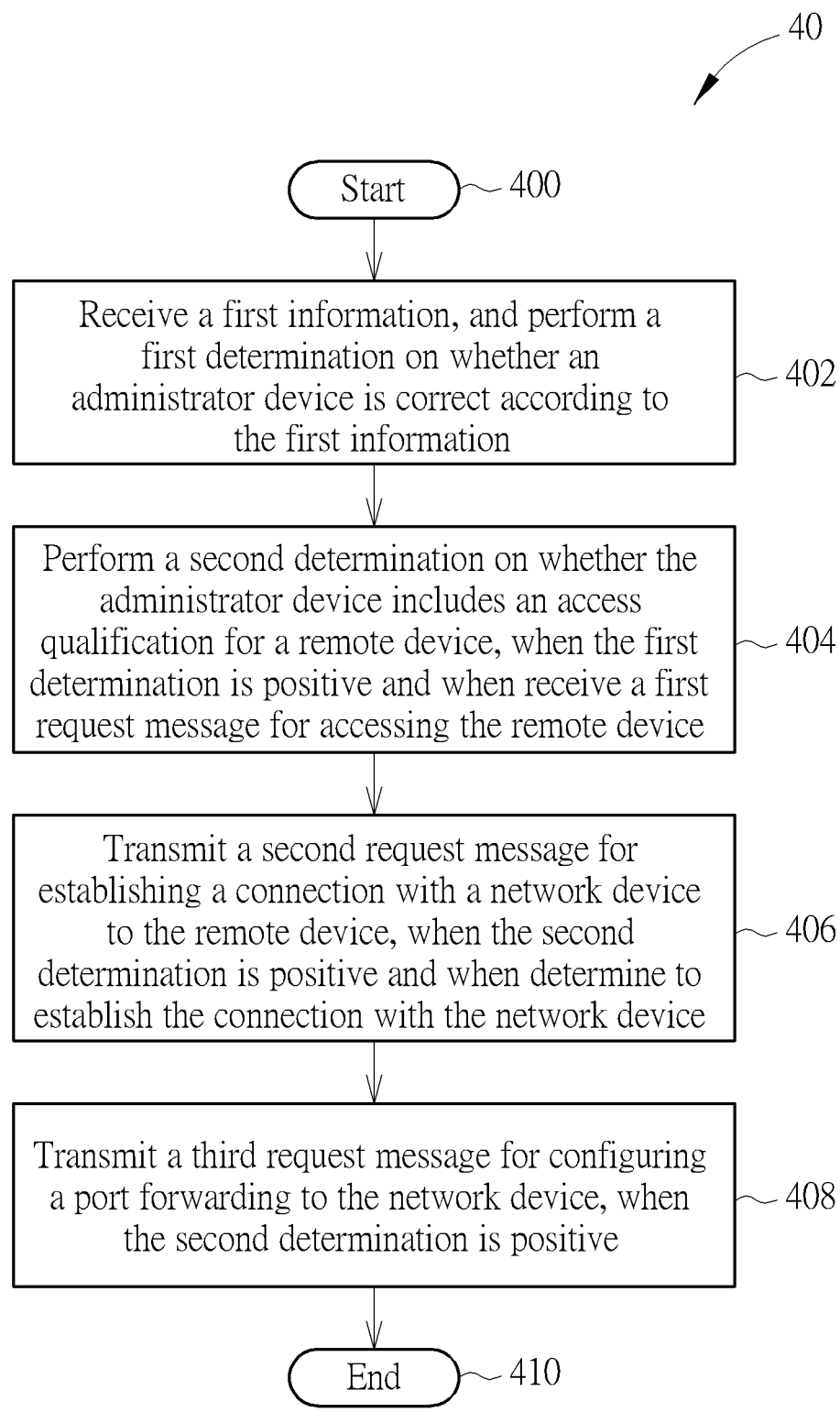
FIG. 4 is a flowchart of a process according to an example of the present invention.

Operations of the management device 20 in the above examples may be summarized into a process 40 shown in FIG. 4. The process 40 may be used for realizing the management device 20, and includes the following steps:

Step 400: Start.

Step 402: Receive a first information (e.g., of an administrator device), and perform a first determination on whether the administrator device is correct according to the first information.

Step 404: Perform a second determination on whether the administrator device includes an access qualification for a remote device, when the first determination is positive and when receive a first request message for accessing the remote device.

Step 406: Transmit a second request message for establishing a connection with a network device to the remote device, when the second determination is positive and when determine to establish the connection with the network device.

Step 408: Transmit a third request message for configuring a port forwarding to the network device, when the second determination is positive.

Step 410: End.

The process 40 may be used for illustrating operations of the management device 20. Details and modifications of the process 40 maybe referred to the above description, and are not repeated herein.

Figure 5:
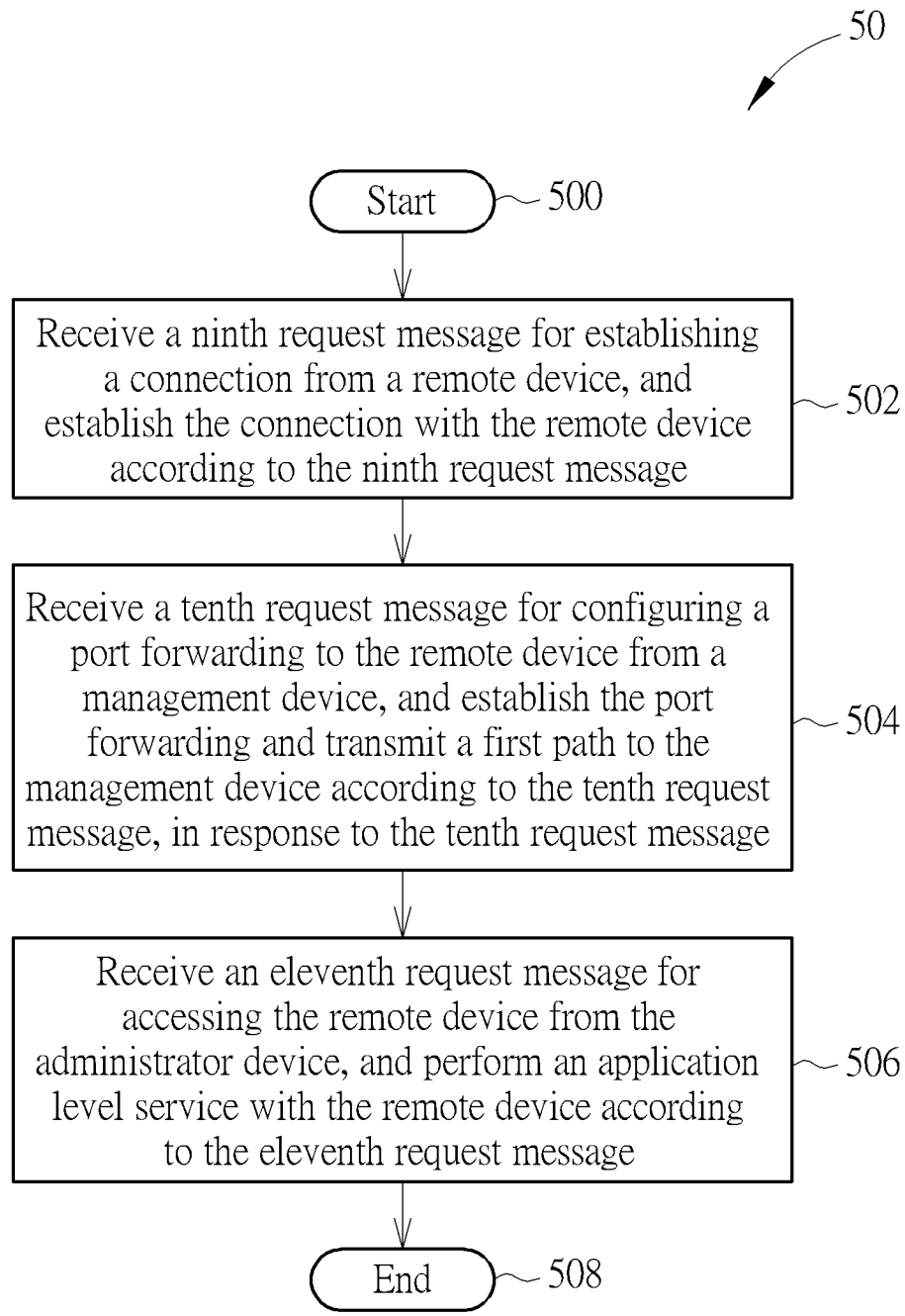
FIG. 5 is a flowchart of a process according to an example of the present invention.

Operations of the network device 30 in the above examples may be summarized into a process 50 shown in FIG. 5. The process 50 may be used for realizing the network device 30, and includes the following steps:

Step 500: Start.

Step 502: Receive a ninth request message for establishing a connection from a remote device, and establish the connection with the remote device according to the ninth request message.

Step 504: Receive a tenth request message for configuring a port forwarding to the remote device from a management device, and establish the port forwarding and transmit a first path to the management device according to the tenth request message, in response to the tenth request message.

Step 506: Receive an eleventh request message for accessing the remote device from the administrator device, and perform an application level service with the remote device according to the eleventh request message.

Step 508: End.

The process 50 may be used for illustrating operations of the network device 30. Details and modifications of the process 50 may be referred to the above description, and are not repeated herein.

The above tenth request message and the above third request message may be the same message.

The numbering of the terms, e.g., "first", "second", . . . or "eleventh" are for distinguishing related terms, and are not for limiting the order of the related terms.

The term "include" may be replaced by "be". The term "determine" may be replaced by "compute", "calculate", "obtain", "generate", "output" or "use". The term "according to" may be replaced by "by using". The term "via" may be replaced by "on" or "in".

Those skilled in the art should readily make combinations, modifications and/or alterations on the abovementioned description and examples. The abovementioned description, modules and/or processes (including suggested steps) may be realized by means that could be hardware, software, firmware (known as a combination of a hardware device and computer instructions and data that reside as read-only software on the hardware device), an electronic system, or combination thereof. Realizations of the present invention may include the management device 20. The management device 20 (and the first authentication module 200, the authorization module 210, the communication module 220 and the integration module 230 therein) are various. For example, the modules mentioned above may be integrated into one or more modules. Realizations of the present invention may include the network device 30. The network device 30 (and the connection module 300, the integration module 310 and the network service module 320 therein) are various. For example, the modules mentioned above may be integrated into one or more modules. Realizations of the present invention may include the administrator device 1000, the management device 1002 and the network device 1004, the firewall 110, and/or the remote device 1200 or combination thereof.

Examples of the hardware may include analog circuit(s), digital circuit(s) and/or mixed circuit(s). For example, the hardware may include application-specific integrated circuit(s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a device, a method and a system of handling an access control. Compared with the prior art, the administrator device of the present invention accesses the remote device via the management device and the network device, and may not access the remote device only according to the access information of the remote device. Thus, a security of the network is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management device for handling an access control, comprising:
    a first authentication module, for receiving a first information, and performing a first determination on whether an administrator device is correct according to the first information;
    an authorization module, coupled to the first authentication module, for performing the following operations:
        performing a second determination on whether the administrator device comprises an access qualification for a remote device, when the first determination is positive and when receiving a first request message for accessing the remote device;
        performing a third determination on whether the administrator device comprises an access right of the remote device, when the first determination is positive; and
        transmitting a second information of the remote device to the administrator device, when the third determination is positive, wherein the second information comprises an identity of the remote device;
    a communication module, coupled to the authorization module, for transmitting a second request message for establishing a connection with a network device to the remote device, when the second determination is positive and when determining to establish the connection with the network device; and
    an integration module, coupled to the authorization module, for transmitting a third request message for configuring a port forwarding to the network device, when the second determination is positive.

2. The management device of claim 1, wherein the first information comprises an account name and a password for the administrator device to access the management device.

3. The management device of claim 1, wherein the first authentication module comprises:
    a second authentication module, for determining whether to perform a multi factor authentication (MFA) on the administrator device when the first determination is positive.

4. The management device of claim 1, wherein the first request message is from the administrator device.

5. The management device of claim 1, wherein the access qualification comprises at least one of an access right for accessing the remote device, accessing the remote device in an allowed time period, or accessing the remote device in an allowed area.

6. The management device of claim 1, wherein the communication module is further for performing the following operation:
    determining to establish the connection with the network device, when the connection is not established with the network device.

7. The management device of claim 1, wherein the second request message comprises an internet protocol (IP) address of the network device.

8. The management device of claim 1, wherein the third request message comprises at least one information of the following information: a source IP address of the administrator device, a destination IP address of the administrator device or a destination port of the administrator device, wherein the source IP address of the administrator device is determined as an external IP address of the administrator device, the destination IP address of the administrator device is determined as an IP address of the remote device, or the destination port of the administrator device is determined as a port of the remote device.

9. The management device of claim 1, wherein the integration module is further for performing the following operations:
receiving a first path from the network device in response to the third request message;
generating a second path according to the first path and an access token; and
transmitting the second path to the administrator device.

10. The management device of claim 9, wherein the access token is generated according to a certificate of the network device.

11. The management device of claim 1, further comprising:
an operation audit module, coupled to the integration module, for storing a record of the administrator device accessing the remote device.

12. The management device of claim 1, wherein the network device comprises a virtual private network (VPN) server.

13. A method of handling an access control for a management device, comprising:
receiving a first information and performing a first determination on whether an administrator device is correct according to the first information;
performing a second determination on whether the administrator device comprises an access qualification for a remote device, when the first determination is positive and when receiving a first request message for accessing the remote device;
performing a third determination on whether the administrator device comprises an access right of the remote device, when the first determination is positive;
transmitting a second information of the remote device to the administrator device, when the third determination is positive, wherein the second information comprises an identity of the remote device;
transmitting a second request message for establishing a connection with a network device to the remote device, when the second determination is positive and when determining to establish the connection with the network device; and
transmitting a third request message for configuring a port forwarding to the network device, when the second determination is positive.

14. The method of claim 13, wherein the first information comprises an account name and a password for the administrator device to access the management device.

15. The method of claim 13, further comprising:
determining whether to perform a multi factor authentication (MFA) on the administrator device when the first determination is positive.

16. The method of claim 13, further comprising:
receiving the first request message from the administrator device.

17. The method of claim 13, wherein the access qualification comprises at least one of an access right for accessing the remote device, accessing the remote device in an allowed time period, or accessing the remote device in an allowed area.

18. The method of claim 13, further comprising:
determining to establish the connection with the network device, when the connection is not established with the network device.

19. The method of claim 13, wherein the second request message comprises an internet protocol (IP) address of the network device.

20. The method of claim 13, wherein the third request message comprises at least one information of the following information: a source IP address of the administrator device, a destination IP address of the administrator device or a destination port of the administrator device, wherein the source IP address of the administrator device is determined as an external IP address of the administrator device, the destination IP address of the administrator device is determined as an IP address of the remote device, or the destination port of the administrator device is determined as a port of the remote device.

21. The method of claim 13, further comprising:
receiving a first path from the network device in response to the third request message;
generating a second path according to the first path and an access token; and
transmitting the second path to the administrator device.

22. The method of claim 21, further comprising:
generating the access token according to a certificate of the network device.

23. The method of claim 13, further comprising:
storing a record of the administrator device accessing the remote device.

24. A system of handling an access control, comprising:
a management device and a network device, wherein the management device comprises:
a first authentication module, for receiving a first information and performing a first determination on whether an administrator device is correct according to the first information;
an authorization module, coupled to the first authentication module, for performing the following operations:
performing a second determination on whether the administrator device comprises an access qualification for a remote device, when the first determination is positive and when receiving a first request message for accessing the remote device;
performing a third determination on whether the administrator device comprises an access right of the remote device, when the first determination is positive; and
transmitting a second information of the remote device to the administrator device, when the third determination is positive, wherein the second information comprises an identity of the remote device;
a communication module, coupled to the authorization module, for transmitting a second request message for establishing a connection with the network device to the remote device, when the second determination is positive and when determining to establish the connection with the network device; and an integration module, coupled to the authorization module, for transmitting a third request message for configuring a port forwarding to the network device, when the second determination is positive; and the network device comprises:

a connection module, for receiving a fourth request message for establishing a second connection from the remote device, and establishing the second connection with the remote device according to the fourth request message;

an integration module, coupled to the connection module, for receiving the third request message for configuring the port forwarding to the remote device from the management device, and establishing the port forwarding and transmitting a first path to the management device according to the third request message, in response to the third request message; and a network service module, coupled to the integration module, for receiving a fifth request message for accessing the remote device from the administrator device, and performing an application level service with the remote device according to the fifth request message.

* * * * *